US010438138B2

United States Patent
Geer

(10) Patent No.: US 10,438,138 B2
(45) Date of Patent: Oct. 8, 2019

(54) RELIABLE AFTERMARKET EVENT TICKET TRANSFER: METHOD AND APPARATUS

(71) Applicant: BLEACHR LLC, Edina, MN (US)

(72) Inventor: Bradley C. Geer, Edina, MN (US)

(*) Notice: Subject to any disclaimer, the term of this patent is extended or adjusted under 35 U.S.C. 154(b) by 0 days.

(21) Appl. No.: 15/571,365

(22) PCT Filed: May 5, 2016

(86) PCT No.: PCT/US2016/030867
§ 371 (c)(1),
(2) Date: Nov. 2, 2017

(87) PCT Pub. No.: WO2016/179337
PCT Pub. Date: Nov. 10, 2016

(65) Prior Publication Data
US 2018/0365596 A1   Dec. 20, 2018

Related U.S. Application Data

(60) Provisional application No. 62/157,490, filed on May 6, 2015.

(51) Int. Cl.
| | | |
|---|---|---|
| G06Q 10/02 | (2012.01) | |
| G06Q 20/04 | (2012.01) | |
| G06Q 20/32 | (2012.01) | |
| G07B 11/00 | (2006.01) | |

(52) U.S. Cl.
CPC .......... *G06Q 10/02* (2013.01); *G06Q 20/045* (2013.01); *G06Q 20/3274* (2013.01); *G07B 11/00* (2013.01)

(58) Field of Classification Search
CPC .... G06Q 10/02; G06Q 20/045; G06Q 20/206; G06Q 20/341; G06Q 20/385
USPC ............... 235/382.5, 382, 375, 487; 705/5
See application file for complete search history.

(56) References Cited

U.S. PATENT DOCUMENTS

| | | | | |
|---|---|---|---|---|
| 6,308,159 | B1 * | 10/2001 | Strohl | G06Q 10/02 705/5 |
| 8,543,813 | B2 | 9/2013 | Feng et al. | |
| 2006/0108418 | A1 * | 5/2006 | Rice | G06Q 10/02 235/382 |
| 2007/0288319 | A1 * | 12/2007 | Robinson | G06Q 30/02 705/14.25 |
| 2010/0228576 | A1 | 9/2010 | Marti et al. | |

(Continued)

OTHER PUBLICATIONS

Jun. 30, 2017 PCT Preliminary Examination Report (Serial No. PCT/US16/30867).
Aug. 17, 2016 PCT Search Report (Serial No. PCT/US16/30867).

*Primary Examiner* — Edwyn Labaze
(74) *Attorney, Agent, or Firm* — Tysver Beck Evans, PLLC

(57) ABSTRACT

The present invention is an apparatus and method for validating a ticket to an event, which is being sold or otherwise transferred in the aftermarket. A management system maintains the status of a ticket, either committed or uncommitted, along with a ticket ID and other ticket and event information. An event entry system requires presentation of a ticket and, if the ticket has been committed, a correct current passkey. The passkey identifies the person presenting the ticket as the owner of the ticket. Ticket validation and uncommitment functionalities are also provided by an after-market ticket validation system.

14 Claims, 10 Drawing Sheets

(56) References Cited

U.S. PATENT DOCUMENTS

| | | | |
|---|---|---|---|
| 2012/0185394 A1* | 7/2012 | Gelfand | G06Q 10/02 |
| | | | 705/44 |
| 2013/0191172 A1 | 7/2013 | Tacchi et al. | |
| 2013/0226635 A1 | 8/2013 | Fisher | |
| 2013/0238372 A1 | 9/2013 | Jordan | |
| 2013/0325523 A1* | 12/2013 | Huang | G06Q 10/02 |
| | | | 705/5 |
| 2015/0262195 A1* | 9/2015 | Bergdale | G06Q 20/0457 |
| | | | 705/5 |
| 2016/0196508 A1* | 7/2016 | Richter | G06Q 10/02 |
| | | | 705/5 |
| 2016/0307379 A1* | 10/2016 | Moore, Jr. | G07C 9/00007 |

* cited by examiner

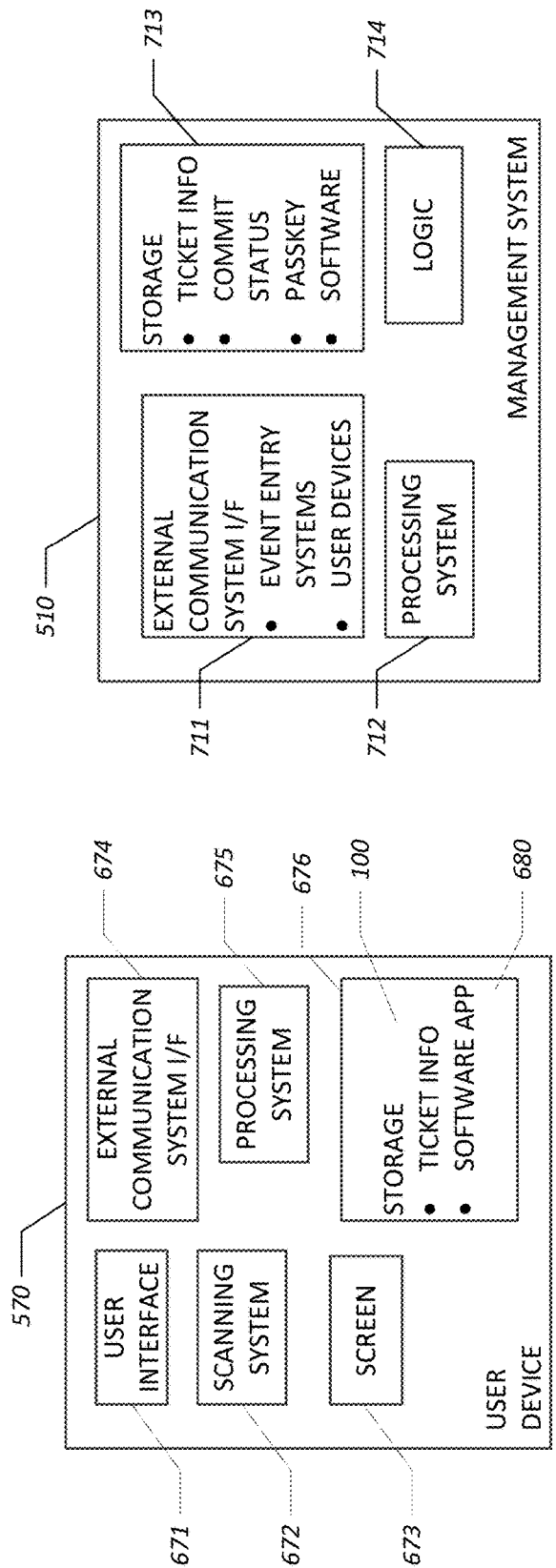
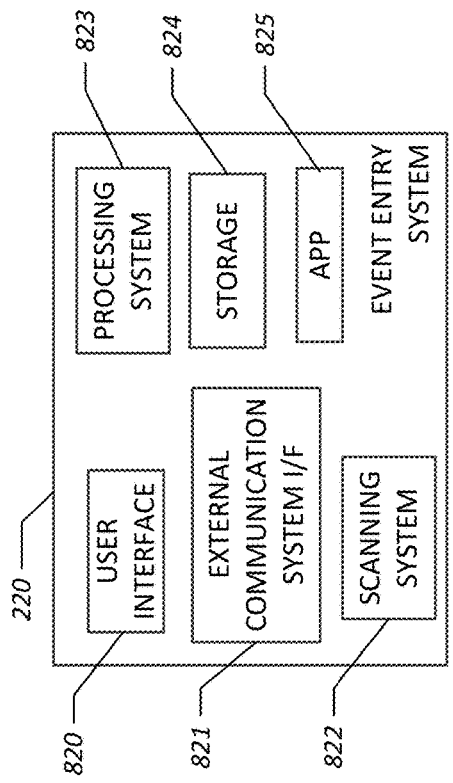
FIG. 6
FIG. 7
FIG. 8

RELIABLE AFTERMARKET EVENT TICKET TRANSFER: METHOD AND APPARATUS

This application claims the benefit of U.S. Provisional Application No. 62/157,492 filed May 6, 2015, and entitled "Validation of After-Market Ticket Transfer: and Apparatus"; and the benefit of PCT Application No. PCT/US16/30867 filed May 5, 2016 and entitled "Reliable Aftermarket Event Ticket Transfer: Method and Apparatus". Both of these applications are hereby incorporated in their entirety by this reference.

FIELD OF THE INVENTION

The present invention relates to ensuring reliable aftermarket ticket sales using user smart mobile devices, a management processing system, and an event entry system.

BACKGROUND OF THE INVENTION

By "storage" we mean tangible computer-accessible electronic storage.

By a "communication system" we mean a combination of hardware devices and logic in software and/or hardware for electronically communicating data in digital form. An exemplary communication system might include a wide-area network such as the Internet; a local-area network (e.g., within a home, business, or school); and/or a personal-area network (e.g., a network implemented with Bluetooth or Infrared Data Association). The term "communication system" is hierarchical, and any combination of communication systems used to transmit data between two hardware devices, such as handheld smart devices, is a communication system. A connection between a hardware device and a communication system is assumed to include at least a hardware interface (I/F).

By "logic", we mean some combination that includes tangible hardware, and may include software, whereby a processing system executes tasks and makes decisions.

By "event information", we mean some or all of a date, a time, a performer or team, a venue, a seat number or area within an event venue, and any other information associated with an event.

By a "mobile smart device" or "mobile device", we mean a smart phone, a tablet computer, an e-reader, a portable computer, or other electronic device whose operation is controlled by one or more processors, and which can be conveniently carried by a user on their person.

By a "user interface control", we mean a touchscreen, a tangible control (e.g., a button or a dial), a scanner, a microphone, a camera, or other means for a user to enter information into a mobile smart device.

By a "user display device", we mean a screen, a speaker, a beeper, an alarm, or other means for a user to receive information from a mobile smart device.

By a "user interface" we mean some combination of user interface controls and user display devices that may be used to provide information to, or receive information from, a mobile smart device.

By a "consumer" in the context of this application, we mean an event consumer—an individual who obtains a ticket entitling them to attend an event as a member of the audience.

By a "barcode" in the context of this application, we mean a one-dimensional barcode, a two-dimensional barcode, or any other similar optically-scannable/readable image.

BRIEF DESCRIPTION OF THE DRAWINGS

FIG. 6 is a block diagram showing components of an illustrative mobile device that is configured to participate in an illustrative AMTVS.

FIG. 7 is a block diagram showing components of an illustrative server that is configured to participate in an illustrative AMTVS.

FIG. 8 is a block diagram showing components of an illustrative event entry system that is configured to participate in an illustrative AMTVS.

DETAILED DESCRIPTION OF EXEMPLARY EMBODIMENTS

Figure 1:
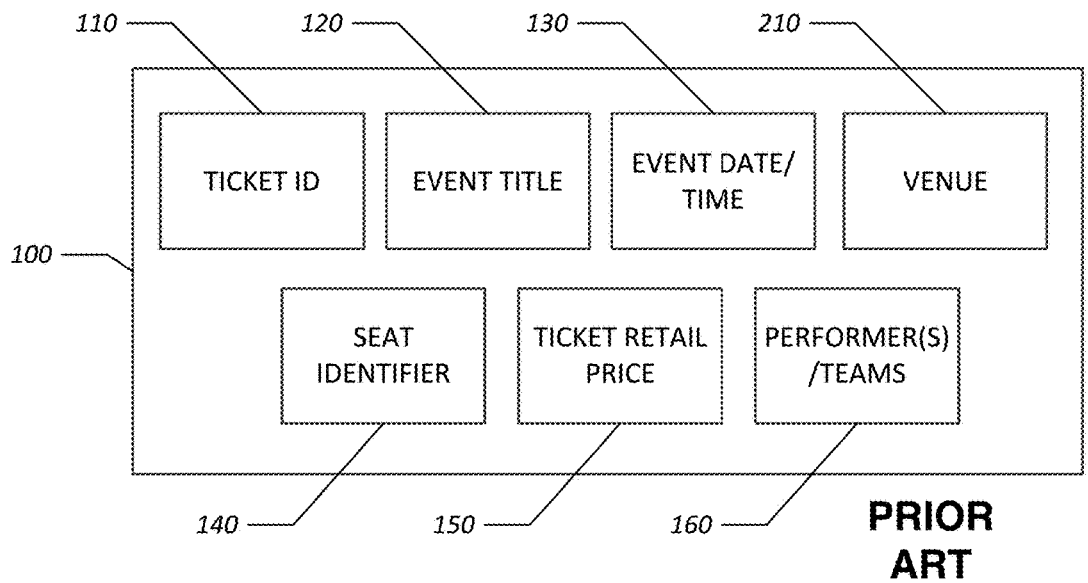
FIG. 1 is a block drawing showing information contained in or on a typical ticket to an event.

This description provides embodiments of the invention intended as exemplary applications. The reader of ordinary skill in the art will realize that the invention has broader scope than the particular examples described here. It should be noted from the outset that the drawings, and the elements depicted by the drawings, may not be to scale. Generally, reference numbers are keyed to the drawing of first appearance. For example, reference number 220 would appear first in FIG. 2; and 460, in FIG. 4. Each such reference will be described at least once, ordinarily in connection with the figure of first appearance. For clarity of the drawings, a given reference number that appears in a second figure will not necessarily be described a second time.

FIG. 1 illustrates exemplary ticket information 100 contained a ticket 200 to an event 250. As a minimum, a ticket 200 will have a ticket identifier (ID) 110, place information, and time information. The ticket information 100 shown in FIG. 1 includes an event title 120, a date/time 130, the venue 170, a seat ID 140, a ticket retail price 150, and a performer 160. The performer 160 might be, for example, an individual, a group of individuals, a band, or sports teams. The ticket ID 110 itself might be a string of text, including alphabetic, alphanumeric, or special characters, or it might be some image, which might or might not represent one or more data text strings. In addition to being scannable, the ticket ID 110 might be human-readable from the ticket 200.

The ticket 200 might be sold initially to a consumer by event management, and/or by one or more third party businesses authorized by event management to sell them. A ticket 200 might be printed for sale to a consumer, or available for download from a website of the seller. A downloaded ticket might be printed by the consumer, or might be stored electronically in storage 676 on a user mobile smart device 570.

As a minimum, an entry system 220 at a gate 221 of a venue 170 will typically check that the ticket ID 110 is valid, corresponds to the current event 250, and has not already been used for entry. Other ticket information 100 might be validated as well. This validation step may be performed using a scanning system 822 at the entry system 220. Various technologies could be used for scanning compatible ticket 200 formats, including, for example, one-dimensional barcodes and two-dimensional barcodes. A printed ticket 200 will typically be scanned by an entry system 220 at the event 250. A ticket 200 stored electronically on a consumer's mobile device 570 might be retrieved by an application (app 676) running on the mobile device 570, and displayed on a screen 673 of the mobile device 570 for scanning by and app 825 executed by the entry system 220. An entry system 220 may accommodate all three types of tickets 200, or be restricted to one or two of the types. Validation of the ticket information 100 from the ticket 200 is done by the entry system 220 in collaboration with the software executed by a processing system 712 on a management system 510, using accurate and up-to-date ticket information 100 accessed from storage 713.

Tickets are initially typically sold directly or indirectly by management of the event. An aftermarket ticket sale is a resale by someone other than the organization or individual that originally issued or sold the ticket. Jurisdictions may limit resale of a ticket 200 in various and inconsistent ways; not permitting, for example: resale for more than the face value of the ticket 200; resale for less than the face value; resale on the street, as opposed to indoors; or resale within a certain distance around the venue 170. Details of these restrictions and prohibitions are outside the scope of this application.

Figure 2:
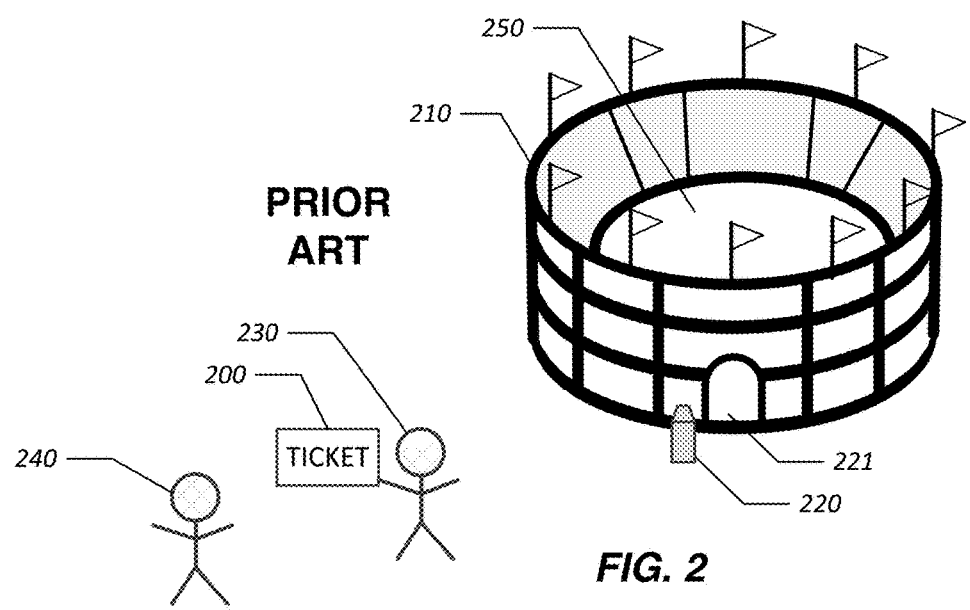
FIG. 2 is a conceptual drawing illustrating an aftermarket ticket sale scenario.

Transfer of ownership of a ticket 200 might be by sale, gift, or by other means (e.g., lottery). FIG. 2 is a conceptual drawing illustrating an aftermarket ticket sale scenario. The seller 230 is an individual who wants to sell what is, at least purportedly, a valid ticket 200 to buyer 240. This raises several concerns for buyer 240 relating to the authenticity of the ticket 200. Often, an image (e.g., a PDF file) of a ticket 200 can be downloaded from the Internet by a consumer. That ticket image might be printed or duplicated many times. Even professionally printed tickets from event management are fairly easy to forge or copy. Electronic transfer between smart devices of a barcode of an e-ticket is similarly easy.

How can buyer 240 be assured that the ticket 200 is valid? And even if the ticket 200 is presently valid, what is to prevent someone else getting to the entry system 220 of the venue 170 first with an apparently identical ticket 200? Possible doubts about the legitimacy of an actually valid ticket 200 may also adversely affect seller 230. How can seller 230 convince a prospective buyer 240 that ticket 200 is valid?

Figure 3:
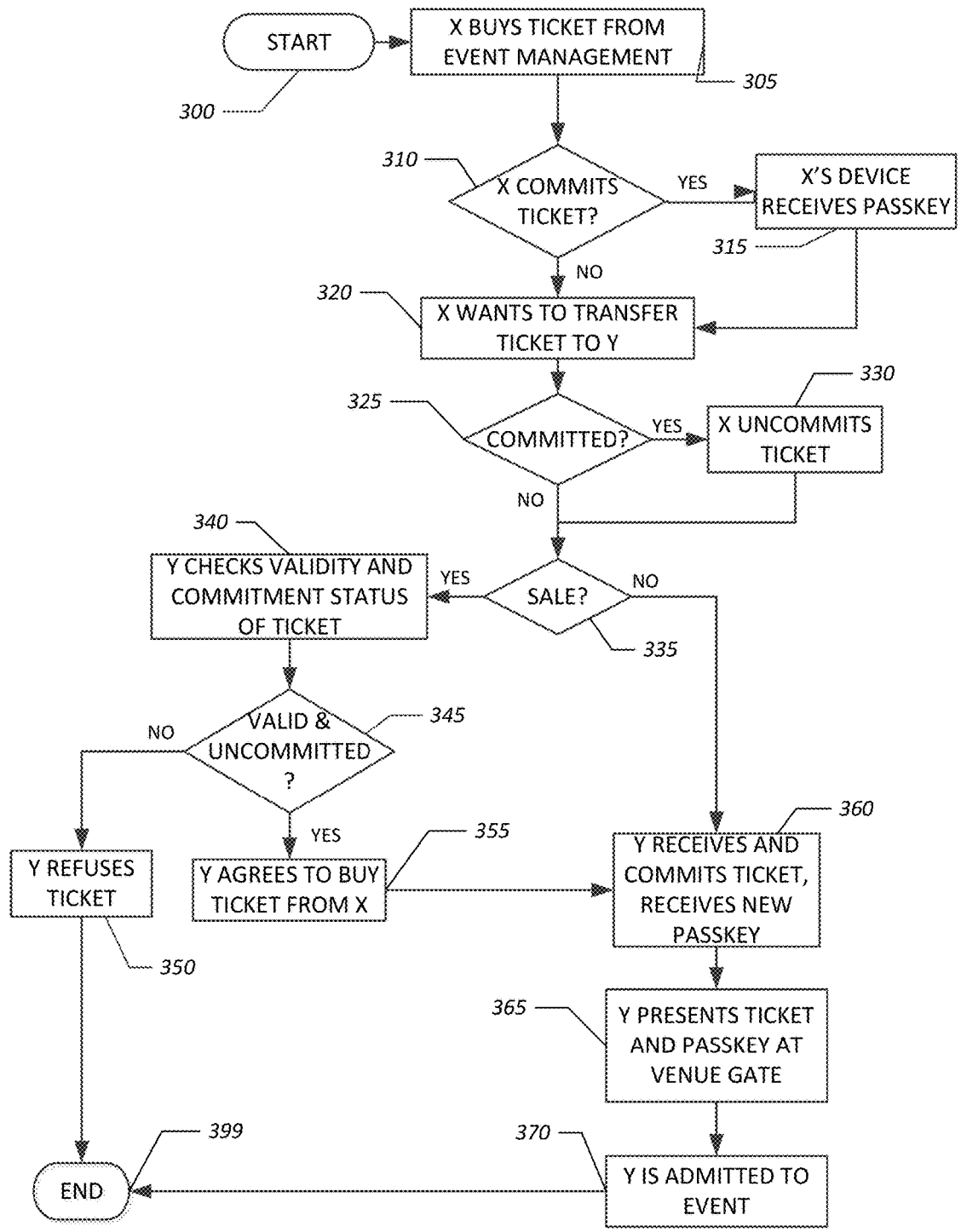
FIG. 3 is a flowchart illustrating an exemplary aftermarket ticket validation system (AMTVS) from the standpoint of two event consumers, transferor X and a transferee Y.

FIG. 3 is a flowchart illustrating an exemplary aftermarket ticket validation system (AMTVS) from the standpoint of two event consumers: X, a transferor (e.g., a seller 230 or donor) of a ticket 200; and Y, a transferee (e.g., a buyer 240 or a donee). After the start 300, X buys 305 the ticket 200 from management of the event 250. To prevent any possible unauthorized attempt to use its ticket ID 110, X may request an application (app) 676 executing on their mobile smart device 570 to "commit" 310 the ticket 200. The app 676 will wirelessly contact a management system 510, which will compare the ticket information 100 with correct information regarding the event 250, which is stored in its storage 713. The management system 510 will also routinely check that the ticket 200 is not already committed. Commitment requires that a passkey 560 be created and recorded 315 on both storage 713 on the management system 510 and storage 676 on the entry system 220. Depending on embodiment, a passkey 560 might be automatically generated by the management system 510, or by the mobile device 570. Preferably, the passkey 560 will be a barcode to allow scanning and electronic transfer. In some embodiments, such as ones where the consumer will be required to provide the passkey 560 manually or orally, an easily-remembered passkey 560 might be entered by the consumer through the user interface 671. Wireless transfer, in the appropriate direction so that both management system 510 and user mobile device 570 have access, of the passkey 560 between the mobile smart device 570 and the management system 510, and recording in storage on the mobile smart device 570, and on the management system 510 in association with the ticket ID 110 and related ticket information 100, completes commitment of the passkey 560. In some embodiments, the name of the user might also be recorded on the management system 510 in connection with the ticket ID 110, ticket information 100, and passkey 560. If a ticket 200 has been committed, entry to the event 250 should require, as a minimum, both a ticket ID 110 and a matching passkey 560.

X now wants 320 to transfer the ticket to Y. If 325 X has committed the ticket 200, it will be at least desirable from Y's viewpoint, and in some embodiments necessary, for X to uncommit 330 it to effect a valid change of ownership. In some embodiments, the management system 510 associates the passkey 560 with the ticket ID 110 and a person's name. Entry to an event 250 in such embodiments might require the entrant to present a valid identification that matches the name, such as a driver license or passport. In other embodiments, the management system 510 may be unaware of the owner of the ticket. In these embodiments, X might simply give Y both the ticket 200 and the passkey 560 that was assigned to X. But then what is to stop X from transferring effectively the same ticket 200 and the same passkey 560 to Z-1, yet another transferee, and perhaps Z-2 as well? Among friends, there may not be a problem, but when buying from a scalper, Y should definitely insist that X uncommit the ticket 200 before Y pays X.

If 335 the transfer is a sale (and possibly even if it is a gift), Y will preferably check 340 the validity and commitment status of the ticket 200. The validation will do a sanity check of the ticket information 100 from the ticket 200 against the ticket information 100 on the management system 510. For example, is this a valid ticket ID 110 for the date, time, and event? Does such a seat ID 140 exist in the venue 170? If 345 the validation and commitment checks are successful, then Y agrees 355 to buy the ticket 200 from X; otherwise, Y refuses 350. Assuming that Y receives an uncommitted, valid ticket 200 by gift or sale, then through Y's mobile smart device 570, Y commits 360 the ticket 200 and receives a new passkey 560. Y then presents 360 the ticket 200 and passkey 560 to the entry system 220 of the venue 170 to enter the event 250, and is admitted 370. The process ends 399.

Figure 4:
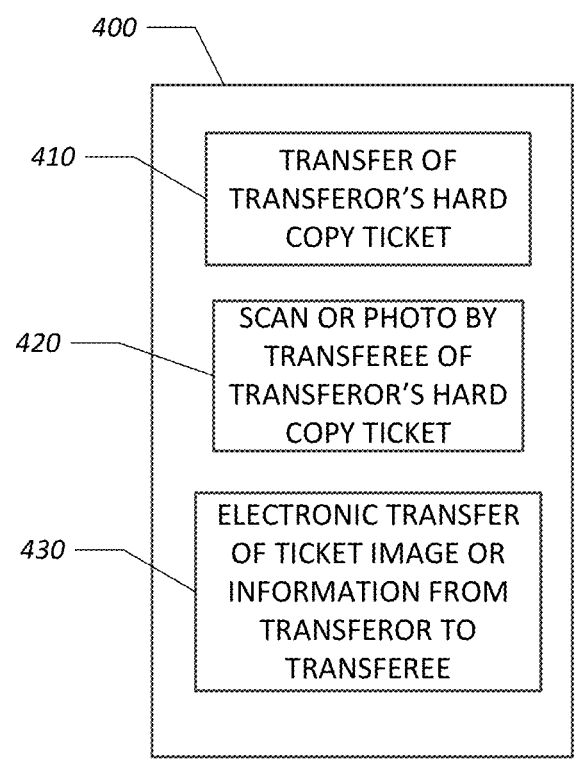
FIG. 4 is a block diagram illustrating methods by which a ticket ID and ticket information might be transferred from a transferor to a transferee.

FIG. 4 is a block diagram showing illustrative means, depending upon embodiment, whereby a transferor might transfer a ticket ID 110 and ticket information 100 to a transferee. These include a direct transfer 410 from transferor to transferee of a hard copy ticket 200, either printed by management or printed by a consumer after download; scanning or photographing 420, by transferee using their mobile device 570, transferor's ticket 200; and electronic transfer 430 (e.g., texting or e-mailing) by transferor their ticket 200 (i.e., ticket ID 110 and ticket information 100) to the transferee.

Figure 5:
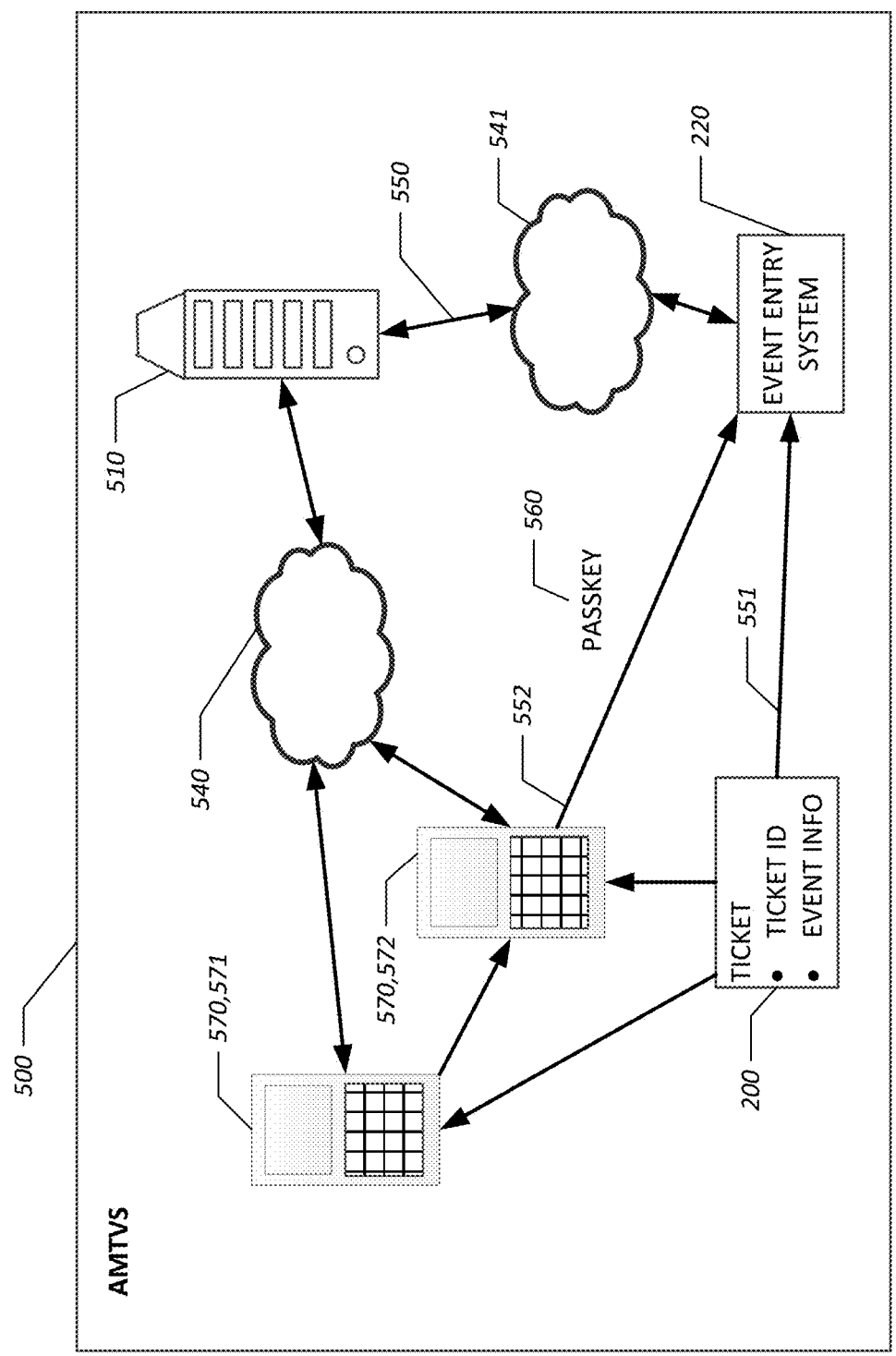
FIG. 5 is a conceptual diagram illustrating interacting components of an AMTVS.
Figure 9:
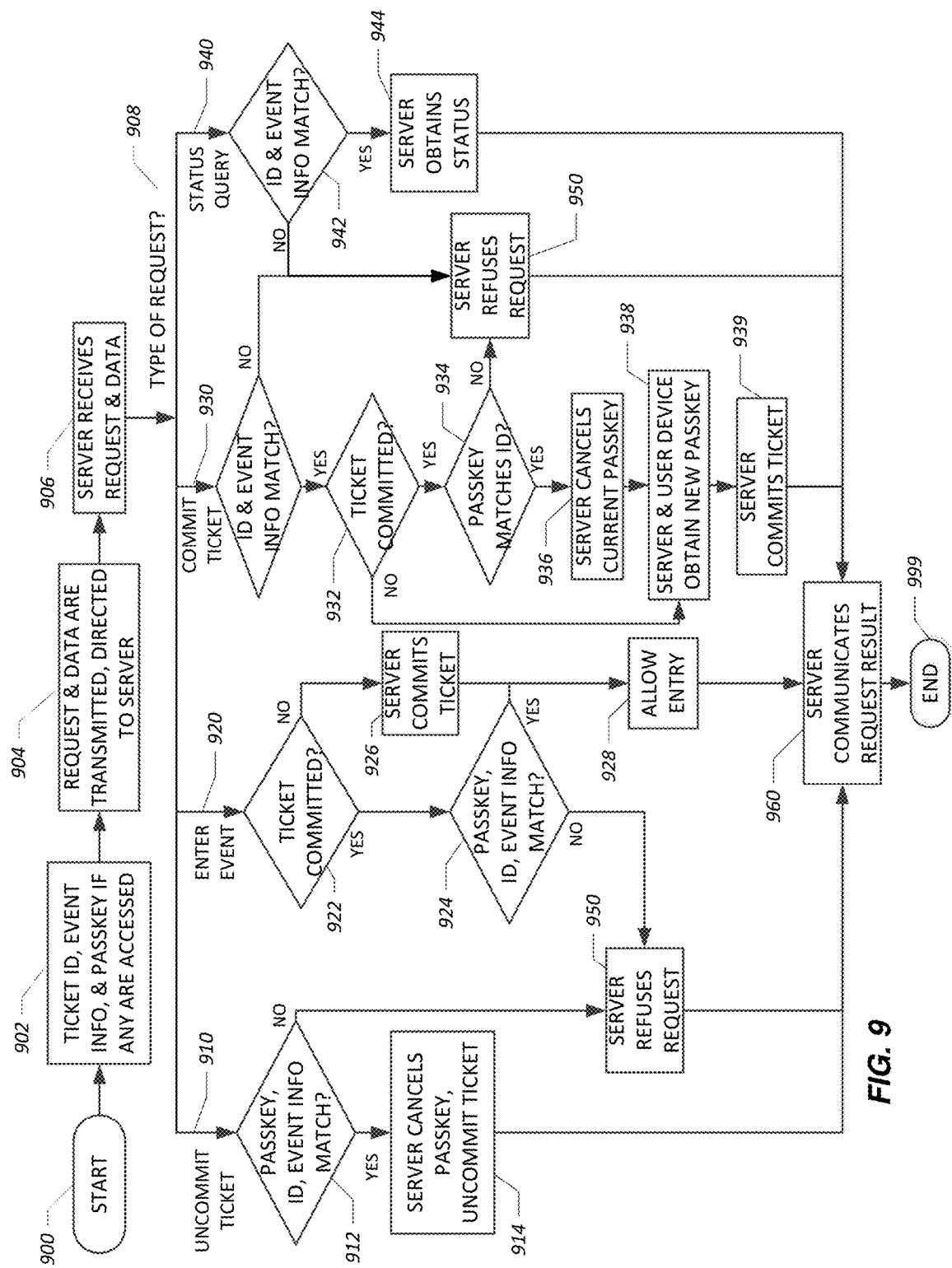
FIG. 9 is a flowchart showing logic of the server of an illustrative AMTVS.

FIG. 5 is a conceptual diagram of an illustrative system—an aftermarket ticket validation system (AMTVS) 500—for validation and commitment check of a ticket 200 being purchased in an aftermarket sale or other transfer, such as a gift. In this AMTVS 500, a management system 510 maintains a commitment status for each ticket 200, either committed or not committed, as well as associated ticket ID 110 and ticket information 100 and, in some embodiments, a name of the person to whom the ticket 200 is committed, if any. FIG. 9 is a flowchart describing exemplary logic of ticket commitment, from the perspective of the management system 510, in some detail.

A seller 230 can commit a ticket 200 with a remote management system 510 using transferor's mobile device 571, and can later uncommit that ticket 200, also with the remote management system 510 and transferor's mobile device 571, to allow a buyer to commit the ticket 200 after the sale. A prospective buyer 240 can check the current commitment status of a ticket 200 using their mobile smart device 570, namely transferee's mobile device 572. In each case, an app 676 executing on the respective mobile device 570 transmits ticket information 100 to management system 510 wirelessly for validation. The wireless transfer might use, for example, WiFi or a mobile phone network. A given embodiment might require the ticket information 100 to be manually entered into the mobile device 570 through its user interface 671; other embodiments might require some form of electronic transfer into the mobile device 570 (e.g., scanning from another mobile smart device 570; downloading from the Internet; e-mail or SMS attachment); other embodiments might allow either manual or electronic transfer of ticket information 100 for validation. The ticket information 100 will include the ticket ID 110, and sufficient other information for management system 510 to confirm that the ticket ID 110 correspond to an event 250 (e.g., there is a performance at this venue 170 at this date/time 130, and there is a seat of this seat ID 140 at that venue 170) and other information are mutually consistent (e.g., there was actually a ticket 200 sold to this event 250 identified by ticket ID 110).

At the time a ticket 200 becomes committed, management system 510 issues a passkey 560. Preferably, the passkey 560 will be generated randomly and automatically. The passkey 560 is a second form of ID for a ticket 200.

The current passkey 560 might be recorded on the ticket 200 itself; for example, in printed (e.g., simple text or barcode) or magnetic form, or with invisible ink readable in ultraviolet light. Alternatively, the passkey 560 might be provided by the attendee themselves; in this case, the attendee might be required to enter the passkey 560 into a hardware device through some user interface 820, or to simply provide it orally to an attendant. If the process requires the attendee to remember the passkey 560, then the passkey 560 might be a simple word or phrase. The entry system 220 obtains the ticket information from the management system 510 for validation against the current passkey 560, if one passkey 560 is currently committed at the time of event entry.

It is assumed that the event has an electronic entry system 220 which receives information from a ticket 200. Either the attendee or an event staffer might facilitate this transfer of ticket information 100 as well as any passkey 560, from the ticket 200 into the entry system 220. For example, either might feed the ticket 200 into a slot for the information to be input by the entry system 220, or run the ticket 200 past a scanner of the entry system 220. If the passkey 560 is readable electronically from the physical ticket 200, then nothing more is required. Otherwise, the attendee might type the passkey 560 into the entry system 220, or a staffer could do so after obtaining the passkey 560 from the attendee orally.

Generation of the passkey 560 might be done using a software application running on the mobile device 570, and uploaded to the management system 510. The software might be distributed or sold by the organization that controls system management on the management system 510, so that organization would then control all aspects of system interaction, with the user only making requests (see, e.g., step 908 of FIG. 9) through the software. A passkey 560 might be chosen by the user, and simply entered through the user interface 671. For this purpose, a simple password (e.g., phone number or pet's name) would probably be adequate. Alternatively, the mobile device 570 might requested by the user through their smart device, which in turn would request the new passkey 560 from the management system 510.

Assuming that a ticket 200 has already been committed, and thus has a current passkey 560, the owner of the ticket 200, again through the user interface 671 of a user mobile smart device 570, may cause the management system 510 to uncommit their ticket 200. In doing so, the management system 510 will cancel the current passkey 560. The owner can then sell the ticket 200, and the buyer 240 can commit the ticket 200 with the management system 510 through their own mobile device 570. A new passkey 560 will be issued by the management system 510 for the ticket 200 to the buyer 240. Because of this new ticket 200 commitment, the ticket 200 of the buyer 240 will be protected at this point against both the seller 230 and third parties.

In FIG. 5, double-headed arrows, typified by arrow 550, indicate two-way electronic communication. Single-headed arrows, typified by arrow 551, indicate one-way electronic communication. Communication between mobile devices 570 and management system 510 uses communication system 540. This might be any communication system, such as the Internet, or any combination of communication systems. Similarly, communication between entry system 220 and management system 510 uses communication system 541, which is not necessarily distinct from communication system 540. The mobile devices 570 will communicate with the management system 510 to make requests regarding a ticket 200 over an external communication system interface 674. Both the mobile device 570 might also communicate over an external communication system interface 674 with the entry system 220 to transfer, for example, the ticket ID, event information, and/or the passkey 560 or type it into a user interface 820 of the entry system 220. In other embodiments, electronic communication by the mobile device 570 with the entry system 220 is unnecessary—the user might simply hand an attendant the physical ticket 200, and orally state a password as the passkey 560. In some embodiments, the ticket information and the passkey 560 might be stored in the mobile device 570, for optical scanning by the entry system 220.

FIG. 6 is a block diagram showing components of an illustrative mobile device 570 that is configured to participate in an illustrative AMTVS 500. The mobile device 570 may contain a user interface 671, whereby a user can make requests regarding a ticket 200, such as those described in connection with step 908 of FIG. 9. The user interface 671 might also be used to enter data, such as information from the ticket 200, or a user choice of a password to be used as a passkey 560. The mobile device 570 may contain a scanning system 672, such as a scanner, RFID reader, or camera, whereby the information (e.g., a barcode) might be accessed from the ticket 200, placed in storage 676, and used by the mobile device 570 in interactions with the management system 510, the entry system 220, or another mobile device 570. The mobile device 570 might include a screen 673, whereby the system might request information from the user, or display the result of a request regarding commitment of the ticket 200. Information on the screen 673 might be scanned for validation of a ticket 200 at an entry system 220. The mobile device 570 includes a processing system 675 which executes one or more software applications that facilitate interaction of the mobile device 570 with a user, with the management system 510, and in some embodiments, with the entry system 220. The mobile device 570 includes a first external communication system interface 674 for communication between the mobile device 570 and the management system 510. The mobile device 570 may also include a second external communication system interface 674 for communication between the mobile device 570 and the entry system 220. The second external communication system interface 674 is not necessarily distinct from the first external communication system interface 674, and may share some or all of its components and logic.

FIG. 7 is a block diagram showing components of an illustrative management system 510 that is configured to participate in an illustrative AMTVS 500. The management system 510 might include one or more computers or processing systems, such as servers, and other component devices. The management system 510 manages databases regarding ticket 200 status, and interacts with the entry system 220 and the mobile device 570. The management system 510 has a processing system 712 that executes logic to carry out its tasks regarding validation of tickets 200. The logic may include software that is accessed from storage 713. Data relevant to validation of tickets 200, such as event information and ticket 200 information, such as ID, passkey 560, and commit status. The management system 510 includes a first external communication system interface 711 for communication between the management system 510 and the mobile devices 570. The management system 510 also include a second external communication system interface 711 for communication between the management system 510 and the entry system 220. The entry system 220 uses information from the management system 510 for deciding whether to admit a person presenting a given ticket 200 to the event 250. The second external communication system interface 674 is not necessarily distinct from the first external communication system interface 674, and may share some or all of its components and logic. Note that the entry system 220 and the management system 510 might in some embodiments be separately located and/or housed, while in others they might be collocated or share some components.

FIG. 8 is a block diagram showing components of an illustrative event entry system 220 that is configured to participate in an illustrative AMTVS 500. The entry system 220 contains a system for entry of data regarding tickets 200. The data entry system might include a scanning system 822, which might include a scanner, a camera, and/or other sensing device, such as an RFID reader. The data entry system might read information from hard copy tickets 200, from a screen 673, or from any other token/device that acts as a ticket 200, depending on embodiment. Alternatively, or in addition, information about a ticket 200 may be entered through a user interface 820. For example, the particular event may use an alphanumeric password as the passkey 560. A person presenting a ticket 200 for entry might simply state the password orally, and an attendant at the entry system 220 may type or speak it into the user interface 820. The entry system 220 includes a processing system 823 to control its ticket 200 validation tasks, and storage 824 for storage and retrieval of any data or software that may be relevant to ticket 200 validation. The entry system 220 includes a first external communication system interface 821 for communication between the entry system 220 and the management system 510. The entry system 220 may also include a second external communication system interface 711 for communication between the entry system 220 and the mobile device 570. The entry system 220 may obtain data regarding a ticket 200 directly from the mobile device 570 using the second external communication system interface 711; for example, by e-mail or by text message. The second external communication system interface 674 is not necessarily distinct from the first external communication system interface 674, and may share some or all of its components and logic.

FIG. 9 is a flowchart showing logic of an illustrative AMTVS 500, primarily from the standpoint of the management system 510. This flowchart pertains to requests for management system 510 validation, commitment, or uncommitment actions that may be initiated by a mobile device 570, as well as a request for event entry that is initiated by an entry system 220. In this flowchart, the management system 510 is referred to as a "server". After the start 900, data necessary for the particular request is accessed 902. Such data might include ticket ID 110, ticket information 100, and passkey 560, and event information. Depending on its type, a request may be initiated through a mobile device 570 or through an entry system 220. The request and data are transmitted 904 to the management system 510, which receives 906 the request and the data. The logic applied by the server depends 908 upon the type of request. Regardless of the type of request, the management system 510 communicates 960 the result of the request to the requesting device, and the process ends 999.

If the request 910 is to uncommit a ticket 200, then if 912 the passkey 560 matches the ticket ID 110 and the ticket information 100, then the management system 510 cancels 914 the current passkey 560 and changes the status of the ticket 200 to uncommitted. Otherwise, the management system 510 refuses 950 the request. This type of request would ordinarily come from a mobile device 570.

A request 920 to allow a ticket holder to enter an event would ordinarily be initiated by the entry system 220, although it might in some embodiments be initiated by a mobile device 570. If 922 the presented ticket 200 is not committed, then in some embodiments, the management system 510 may allow entry, and automatically commit the ticket 200 so others cannot reuse the ticket ID 110. In other embodiments, the management system 510 may only allow entry to committed ticket 200 holders. In this case, when a ticket 200 is originally sold, the buyer 240 may be provided with, or asked to provide, a passkey 560, so that the ticket 200 will initially be committed. If 922 a ticket 200 presented for event entry is already committed, then if 924 the event information is inappropriate for the event, or if no passkey 560 is given by the ticket 200 holder, or if the passkey 560 is inconsistent with the event or the other ticket 200 information, then the management system 510 refuses 950 the request. If all the information is appropriate and mutually consistent, the management system 510 preferably retains the status of the ticket 200 as committed.

In the scenario of FIG. 2, the seller 230 of the ticket 200 may have already committed the ticket 200 for his own protection. Upon sale, seller 230 may provide buyer 240 with the current passkey 560; the seller 230 should then commit the ticket 200 with a new passkey 560. A request 930 to commit a ticket 200 would ordinarily be initiated by a user mobile device 570. For example, in the scenario of FIG. 2, the buyer 240 after purchasing the ticket 200 should immediately ask the software application running on the mobile device 570 to commit the ticket 200. If the ticket ID 110 or ticket information 100 do not match (or the ticket 200 may pertain to a past event 250 or a future event 250 not managed by this particular AMTVS 500), the management system 510 refuses 950 the request. Otherwise, if 932 the ticket 200 is uncommitted then a new passkey 560 is obtained 938 by the management system 510 and the mobile device 570. Depending upon embodiment, the management system 510 may itself issue the new passkey 560, the new passkey 560 may be selected by the user through the user interface 671 of the mobile device 570, or the mobile device 570 might automatically generate the new passkey 560. If 932 the ticket 200 is already committed, then if the passkey 560 does not match the ticket ID 110, the ticket information 100, and/or the passkey 560 as saved in storage 713, then the management system 510 refuses 950 the request; otherwise if a match is found, then the management system 510 cancels 936 the current passkey 560 and a new passkey 560 is obtained 938 and committed 939.

A buyer 240 might want the seller 230 to first show that a ticket 200 is committed, and then show that the buyer 240 has uncommitted the ticket 200 in preparation for sale. When the type of request is a status query 940, the management system 510 checks whether 942 the ID and the event information match and are appropriate (e.g., not in the past), and if so obtains 944 the status of the ticket 200.

Figure 10:
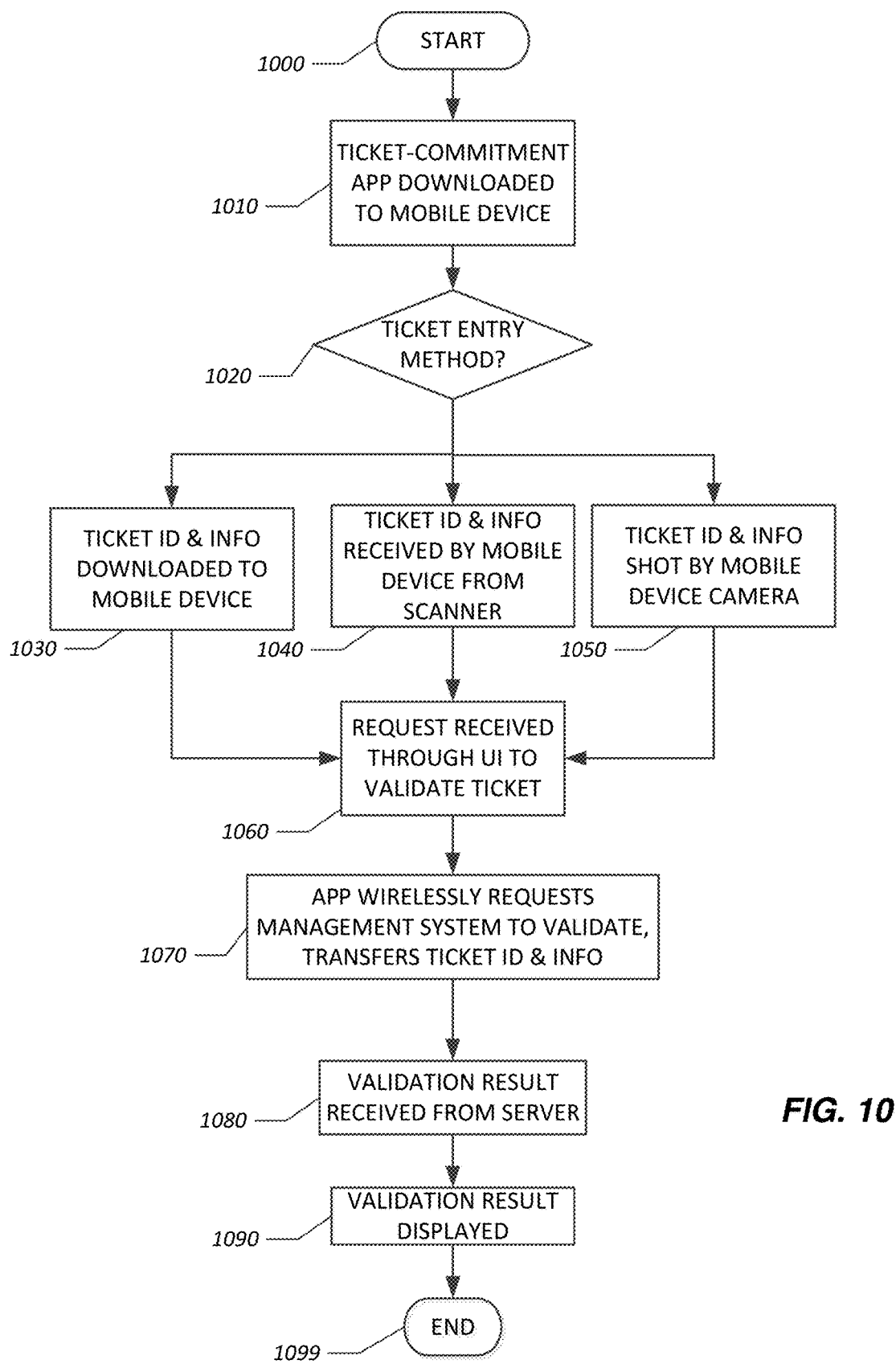
FIG. 10 is a flowchart showing illustrative processing by a user smart mobile device for validation of a ticket.

FIG. 10 is a flowchart showing illustrative processing by a user mobile smart device 570 for validation of a ticket 200. After the start 1000, an app 676 that handles ticket 200 commitment, uncommitment, validation, and display is downloaded to a user mobile smart device 570. The user may use the app 676 to store a ticket 200 on the mobile device 570. The ticket ID 110 and ticket information 100 might be available in storage 676 by several methods 1020, some or all of which might be supported by a given embodiment. They might be downloaded 1030 directly to the mobile device 570, for example either from across a network, by e-mail, or by text message. Alternatively, the ticket ID 110 and ticket information 100 might be scanned 1040. The scanner might be built into the mobile device 570, or might be external. Or the ticket ID 110 and ticket information 100 might be photographed 1050 by the mobile device 570, possibly from another user's mobile device 570 during a sale of the ticket 200. The ticket ID 110 and ticket information 100 might be saved in various forms in storage 676, depending on the particular app 676. For example, a scanned or copied barcode might be saved in that raw format, or the app 676 might parse the image it has received into individual data elements. The user requests 1060, through the user interface 671, the app 676 to validate the ticket 200. The app 676 wireless transfers a request, directed to a remote management system 510 running logic 714 compatible with the app 676, to validate the ticket 200, along with the ticket ID 110 and ticket information 100. The result of the validation is received 1080 from the management system 510, and may be displayed 1090 on a screen 673 of the mobile device 570. The management system 510 might also indicate in the results whether the ticket 200 is already committed. The process ends 1099.

Figure 11:
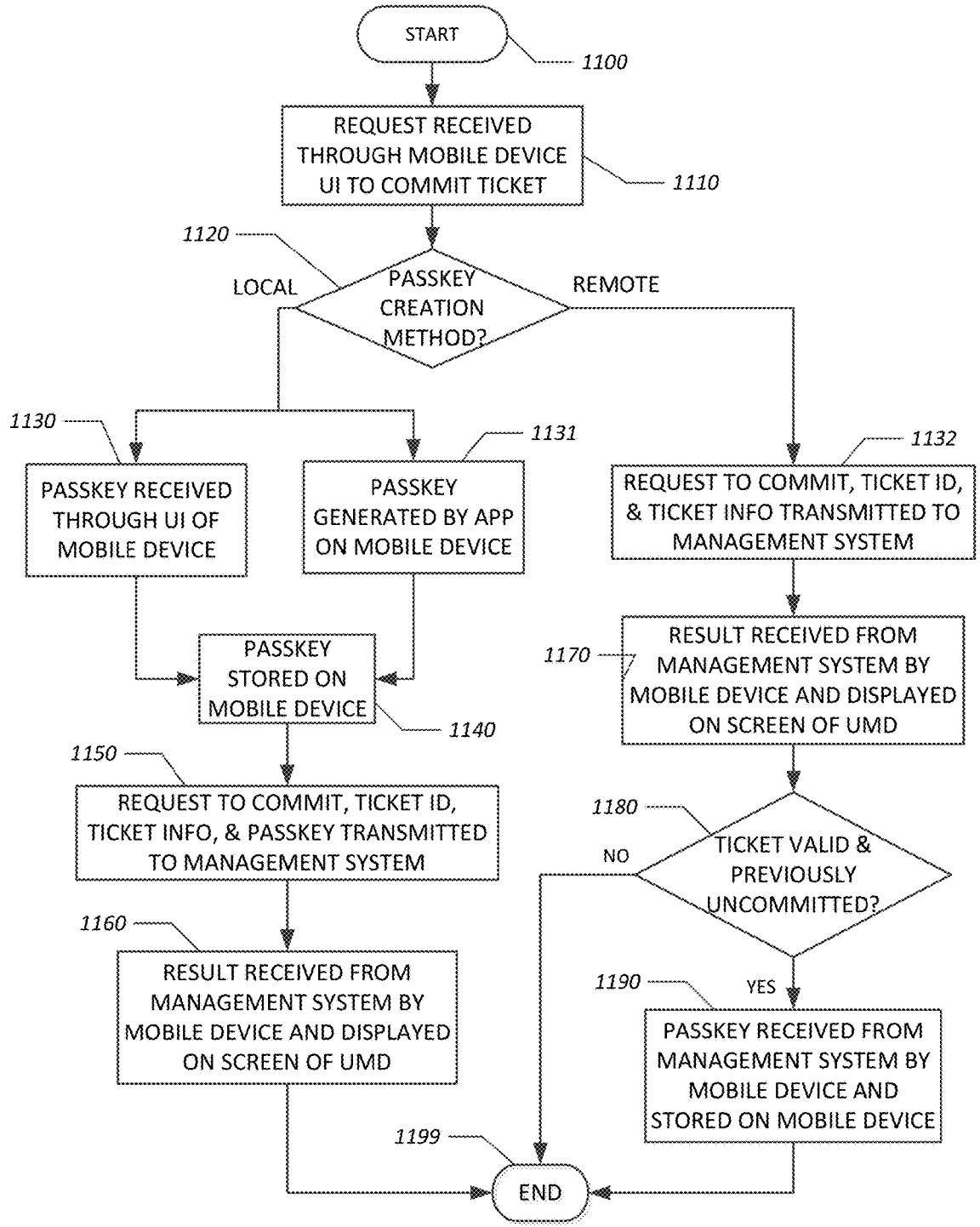
FIG. 11 is a flowchart showing illustrative processing by a user smart mobile device for commitment of a ticket.

FIG. 11 is a flowchart showing illustrative processing by a user mobile smart device 570 for commitment of a ticket 200. It is assumed that the ticket ID 110 and ticket information 100 are already available on the mobile device 570. After the start 1100, a request is received 1110 through the user interface 671 to commit the ticket 200.

Figure 12:
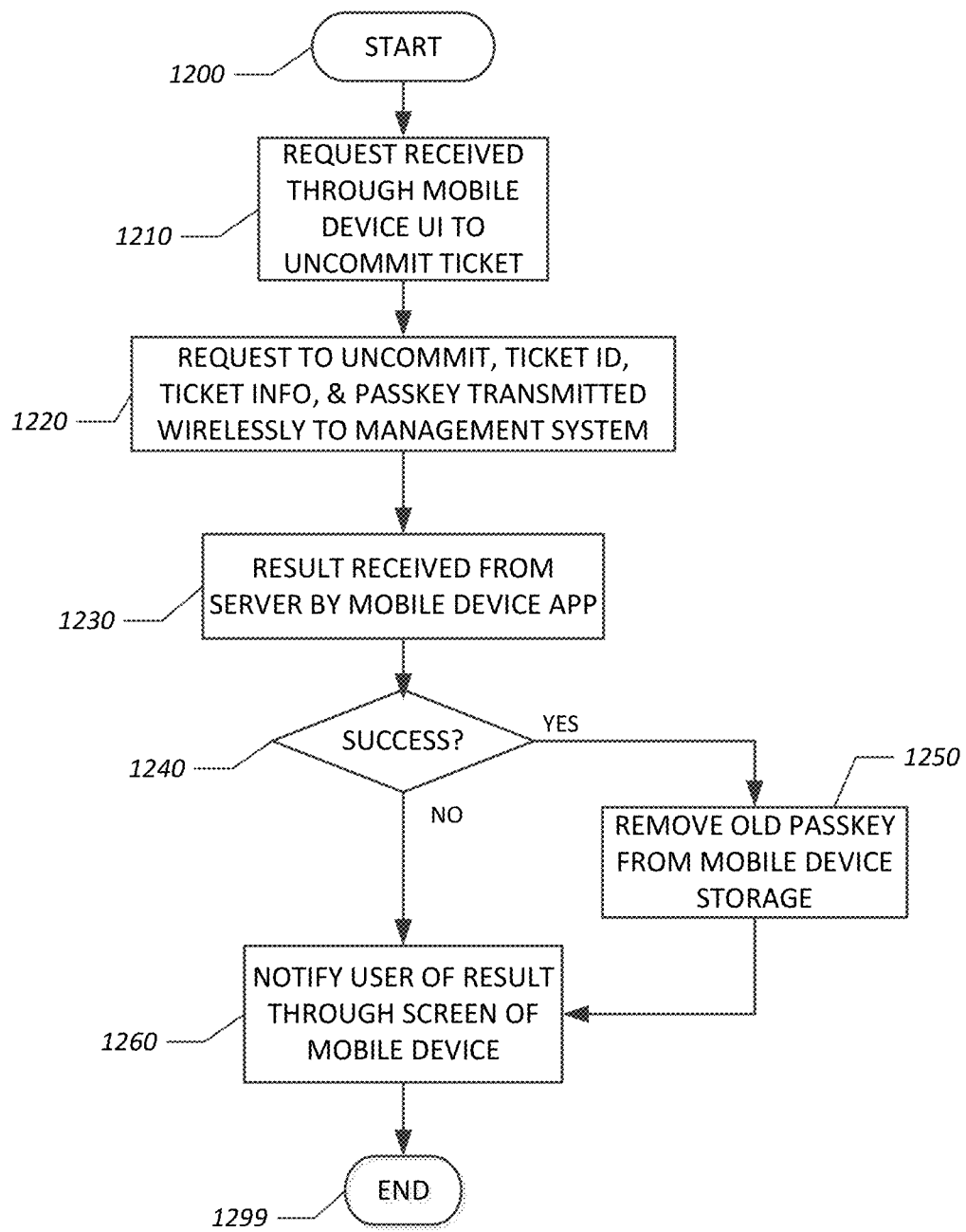
FIG. 12 is a flowchart showing illustrative processing by a user smart mobile device for uncommitment of a previously-committed ticket.

FIG. 12 is a flowchart showing illustrative processing by a user mobile smart device 570 for uncommitment of a ticket 200. After the start 1200, a request is received 1210 by the app 676, through the user interface 671 of the mobile device 570, to uncommit the ticket 200. In response, the mobile device 570 transmits a request wirelessly to uncommit to the management system 510, along with the current ticket ID 110, ticket information 100, and passkey 560. The result of the request is received wirelessly from the management system 510. If the management system 510 finds all the data to be valid, including the old passkey 560, then the result will be positive, and association of the old passkey 560 with the ticket 200 will be removed by the management system 510. If 1240 the result is successful, the old and no longer valid passkey 560 will be removed 1250 by the app 676 from storage 676. In either case, the result will be displayed 1260 by the app 676 on the screen 673.

Figure 13:
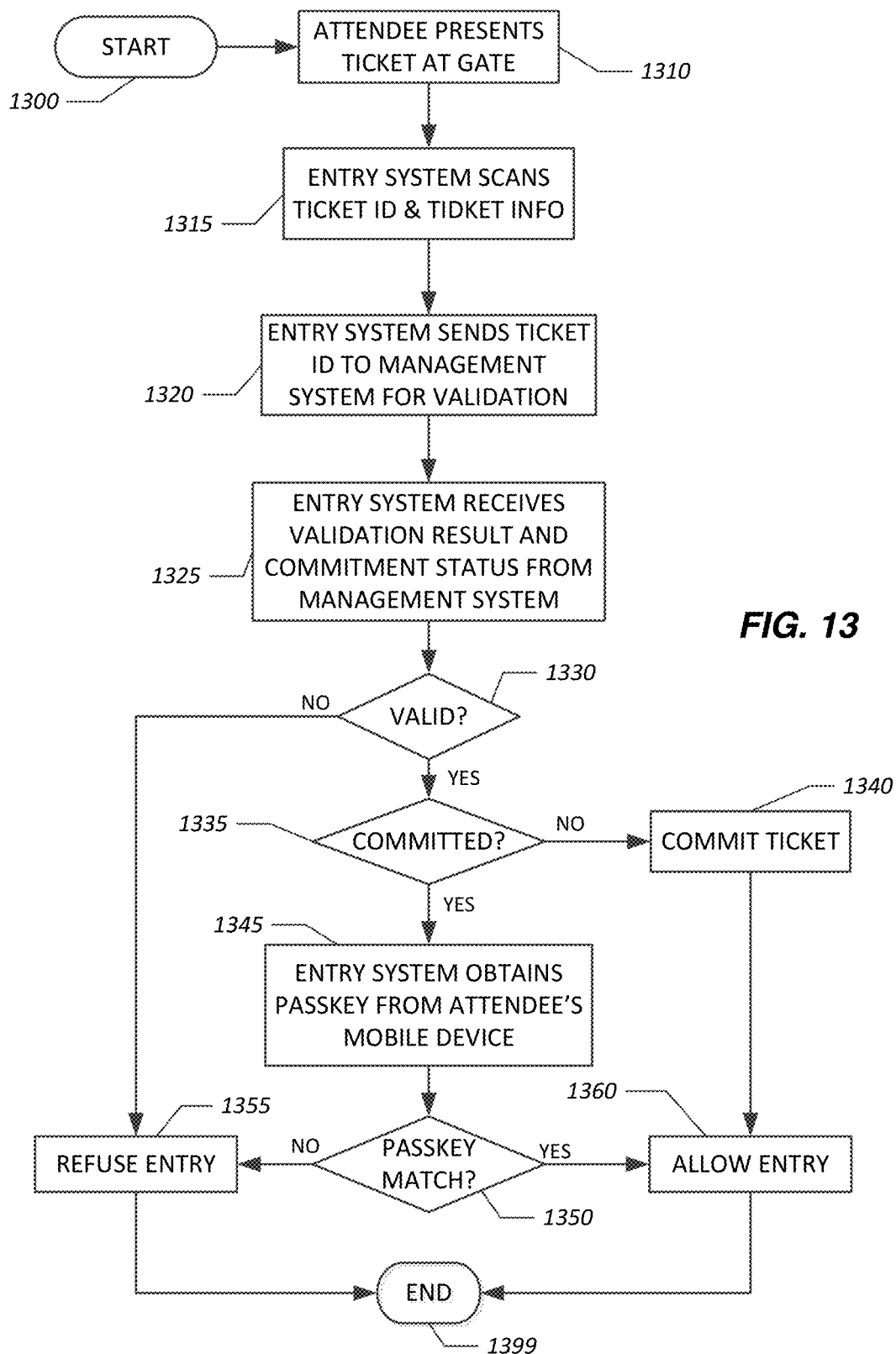
FIG. 13 is a flowchart showing illustrative processing by an event entry system, interacting with a server, to check a passkey, ticket ID, and ticket information obtained from a user smart mobile device, by an attendee seeking entry to an event.

FIG. 13 is a flowchart showing illustrative processing by an event entry system 220, interacting with a management system 510, to check a passkey 560, ticket ID 110, and ticket information 100 obtained from a perspective attendee seeking entry to an event 250. After the start 1300, the prospective attendee presents 1310 a ticket 200 at the gate 221 of the venue 170. This ticket 200 might scannable or otherwise electronically readable from a mobile device 570, or it might be a paper ticket 200—either one printed by management of the event 250, or one printed by an individual after they download a ticket 200 image, possibly with a barcode, from the Internet. The entry system 220, using an app 825, obtains 1315 the ticket ID 110 and ticket information 100, and transmits 1320 that information wirelessly, directed to the management system 510. The management system 510 validates this data against the corresponding true data that it has in storage 713. The entry system 220 receives 1325 the result back from the management system 510 and preferably displays the result for a gate attendant. If 1330 the ticket 200 is invalid, then entry is refused 1355. Otherwise, if 1335 the ticket 200 is committed, then the entry system 220 obtains 13 the passkey 560 recorded in the user mobile smart device 570, from the app 676. The passkey 560 on the user mobile smart device 570 is compared (possibly after another transmission exchange with the management system 510) with the passkey 560 in storage 713. If 1350 the passkeys 560 match, then entry is allowed 1360; otherwise, entry is refused 1355. If the ticket 200 is valid and not committed, then the management system 510 might commit 1340 the ticket 200, possibly with a random passkey 560 known to no one, to protect prospective transferees, particularly buyers 240, from purchasing an already-used ticket 200.

Some embodiments of the present invention may not use a passkey 560. In these embodiments, a ticket 200 is either committed or uncommitted. A user, through their mobile device 570, can request the committed status of a ticket 200. If the ticket 200 is already committed, they would probably not want to purchase the ticket 200. If they do purchase the ticket 200, they can request that the management system 510 commit the ticket 200. This approach offers some, but only limited, protection to the buyer 240. Anyone can present a duplicate ticket 200 to the entry system 220, and that person will be admitted.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A method, comprising:
   a) for each of a first ticket, a second ticket, and a third ticket, receiving by a management system, which includes a hardware processor and tangible computer-accessible management system storage, from a respective user mobile smart device (UMSD) through a communication system, which includes a management system hardware interface,
      (i) a request to commit the respective ticket to an event, and
      (ii) a respective ticket identifier and respective candidate ticket and event information;
   b) for each of the first, second, and third tickets, determining by the management system whether a respective passkey that corresponds to the respective ticket identifier already exists in management system storage;
   c) for the first ticket, determining that such a respective passkey does already exist in management system storage, and transmitting wirelessly a response, directed to the first UMSD, that the respective request has failed;
   d) for each of the second and third ticket,
      (i) determining that such a respective passkey does not already exist in management system storage, and
      (ii) attempting to validate the respective ticket identifier and the respective candidate ticket and event information;
   e) for the second ticket,
      (i) determining that the attempt to validate has failed, and
      (ii) transmitting wirelessly a response, directed to the second UMSD, that the respective request has failed; and
   f) for the third ticket,
      (i) determining that the attempt to validate has succeeded,
      (ii) storing a new passkey in management system storage that corresponds to the respective ticket identifier, and
      (iii) transmitting wirelessly a response, directed to the third UMSD, that the respective request has succeeded.

2. The method of claim 1, further comprising:
   g) wirelessly transmitting by the third USMD to the management system, for the third ticket
      (i) the request to commit the third ticket, and
      (ii) the ticket identifier and the candidate ticket and event information;
   h) wirelessly receiving by the third USMD from the management system the response to the request;
   i) displaying an indication of the response on a screen of the third USMD; and
   j) storing the new passkey in USMD storage.

3. The method of claim 2, further comprising:
   k) receiving the new passkey through a user interface of the third USMD, and
   l) wirelessly transmitting the new passkey to the management system.

4. The method of claim 2, further comprising:
   k) automatically generating the new passkey by a software application executing on the third USMD,
   l) wirelessly transmitting by the third USMD the new passkey to the management system, and
   m) receiving the new passkey by the management system.

5. The method of claim 2, further comprising:
   k) automatically generating the new passkey by logic executing on the management system,
   l) wirelessly transmitting the new passkey by the management system to the third USMD, and
   m) receiving the new passkey by the third USMD.

6. The method of claim 2, further comprising:
   k) photographing the ticket identifier of the third ticket using a camera of the third USMD.

7. The method of claim 6, wherein the ticket identifier is photographed from a ticket printed on paper.

8. The method of claim 6, wherein the ticket identifier is photographed from a display of another USMD.

9. The method of claim 2, further comprising:
   k) receiving by the third USMD the ticket identifier of the third ticket by text message or e-mail.

10. A method, comprising:
    a) for each of a first ticket, a second ticket, and a third ticket, receiving by a management system, which includes a hardware processor and tangible computer-accessible management system storage, from a user mobile smart device through a communication system, which includes a management system hardware interface,
       (i) a request that requires uncommitment of the respective ticket to an event,
       (ii) a respective ticket identifier and respective candidate ticket and event information, and
       (iii) a respective candidate passkey corresponding to the respective ticket identifier;
    b) for each of the first, second and third tickets, determining by the management system whether the respective candidate passkey matches a respective current passkey stored in the management system storage;
    c) for the first ticket,
       (i) determining that the respective candidate passkey does not match the respective current passkey, and
       (ii) transmitting wirelessly an indication that the respective request has failed;
    d) for each of the second and third tickets,
       (i) determining that the respective candidate passkey does match the respective current passkey, and
       (ii) attempting to validate the respective ticket identifier and the respective candidate ticket and event information;
    e) for the second ticket,
       (i) determining that the attempt to validate has failed, and (ii) transmitting wirelessly an indication that the respective request has failed; and
f) for the third ticket,
(i) determining that the attempt to validate has succeeded, and
(ii) transmitting wirelessly an indication that the respective request has succeeded.

11. A method, comprising:
a) for each of a first ticket and a second ticket, receiving by a management system, which includes a hardware processor and tangible computer-accessible management system storage, from a user mobile smart device through a communication system, which includes a management system hardware interface,
(i) a request that requires validation of the respective ticket to an event,
(ii) a respective ticket identifier and respective candidate ticket and event information, and
b) for each of the first and second tickets, determining by the management system whether data matching the respective ticket identifier and respective candidate ticket and event information match exists in management system storage;
c) for the first ticket,
(i) determining that the data matching has failed, and
(ii) transmitting wirelessly an indication that the respective request has failed; and
d) for the second ticket,
(i) determining that the data matching has succeeded, and
(ii) transmitting wirelessly an indication that the respective request has succeeded.

12. A method, comprising:
a) for each of a first ticket, a second ticket, a third ticket, a fourth ticket, a fifth ticket, and a sixth ticket, receiving by a management system, which includes a hardware processor and tangible computer-accessible management system storage, from an event entry system through a communication system, which includes a management system hardware interface,
(i) a request to authorize a holder of the respective ticket to enter an event, and
(ii) a respective ticket identifier and respective candidate ticket and event information;
b) for each of the first, second, and third tickets,
(i) not receiving a respective candidate passkey in association with the respective ticket identifier, and
(ii) determining whether a respective passkey exists in management system storage for the respective ticket identifier;
c) for the first ticket, determining that a respective passkey does exist in management system storage for the respective ticket identifier;
d) for each of the second and third tickets,
(i) determining that a respective passkey does not exist in management system storage for the respective ticket identifier, and
(ii) attempting to validate the respective ticket by determining by the management system whether data matching the respective ticket identifier and respective candidate ticket and event information match exists in management system storage;
e) for the second ticket, determining that attempting to validate the ticket failed;
f) for the third ticket, determining that attempting to validate the ticket succeeded;
g) for each of the fourth, fifth, and sixth tickets,
(i) receiving a respective candidate passkey in association with the respective ticket identifier, and
(ii) determining whether the respective candidate passkey matches a passkey in management system storage for the respective ticket identifier;
h) for the fourth ticket, determining that the candidate passkey does not match a passkey in management system storage for the respective identifier;
i) for each of the fifth and sixth tickets, attempting to validate the respective ticket by determining by the management system whether data matching the respective ticket identifier and respective candidate ticket and event information match exists in management system storage;
j) for the fifth ticket, determining that attempting to validate the ticket failed;
k) for the sixth ticket, determining that attempting to validate the ticket succeeded;
l) for each of the first, second, fourth, and fifth tickets, transmitting a refusal to authorize the holder to enter the event; and
m) for each of the third and sixth tickets, transmitting an authorization to allow the holder to enter the event.

13. A method, comprising:
a) receiving, by a software application executing on a venue entry station processing system, ticket data for each of a first ticket, a second ticket, and a third ticket, wherein the ticket data includes
(i) a respective ticket identifier,
(ii) respective event information, and
(iii) respective ticket information, and
(iv) for the third ticket only, a passkey, and
c) wirelessly transmitting the respective ticket data for each ticket to a management processing system, requesting authorization to permit a respective ticket holder to enter an event;
d) for each of the tickets, wirelessly receiving from the management processing system a respective refusal to authorize entry into the event and a respective reason for refusal, wherein
(i) for the first ticket, the reason indicates that the ticket data is not valid for the event,
(ii) for the second ticket, the reason indicates that the the ticket is committed with a passkey, and no passkey was received by the management processing facility, and
(iii) for the third ticket, the reason indicates that the passkey transmitted by the entry station processing system does not match a correct passkey;
e) for each ticket, displaying an indication of the respective reason for refusal on a user interface of the entry station processing system.

14. A system, comprising:
a) a plurality of user mobile smart devices (UMSDs) each of which includes, respectively, a UMSD processor, UMSD software, a USMD user interface, a USMD display, and a UMS hardware wireless communication system interface; and
b) a management processing system (MPS), which includes an MPS processor, MPS storage, MPS software, and an MPS hardware wireless communication system interface, and
(i) validation logic, which
(A) receives through the MPS communication system interface, from a UMSD in the plurality, ticket data and a ticket validation request, (B) compares the ticket data, which includes a ticker identifier, event information, and ticket information, with corresponding ticket data in MPS storage, and
(C) transmits through the MPS communication system interface a response, based upon the comparison, to the validation request, (ii) commitment-check logic, which
  (A) receives through the MPS communication system interface, from a UMSD in the plurality, a ticket identifier and a commitment-check request,
  (B) compares the ticket identifier with data in MPS storage and determines whether the ticket identifier is already committed, and
  (C) transmits through the MPS communication system interface a response, based upon the comparison, to the commitment-check request, (iii) uncommitment logic, which
  (A) receives through the MPS communication system interface, from a UMSD in the plurality, a ticket identifier, a passkey, and an uncommitment request,
  (B) compares the ticket identifier and the passkey with data in MPS storage, and
  (C) transmits through the MPS communication system interface a response, based upon the comparison, to the uncommitment request, (iv) commitment logic, which
  (A) from each of a first UMSD, a second USMD, and a third UMSD in the plurality, receives through the MPS communication system interface respective ticket data and a respective commitment request,
  (B) for each of the first, second, and third commitment requests, compares the respective ticket data, which includes a ticker identifier, event information, and ticket information, with data in MPS storage,
  (C) for the first commitment request, determines that the ticket is already committed, so the request will be refused,
  (D) for the second commitment request, determines that the ticket data does not correspond with data in MPS, storage, so the request will be refused, and
  (E) for the third commitment request, determines that the ticket is uncommitted and that the ticket data, which includes a ticker identifier, event information, and ticket information, corresponds with data in MPS storage, and enters a new passkey in MPS corresponding to the ticket identifier.

* * * * *